(12) United States Patent
McAllister et al.

(10) Patent No.: US 8,488,890 B1
(45) Date of Patent: Jul. 16, 2013

(54) PARTIAL COVERAGE LAYERS FOR COLOR COMPRESSION

(75) Inventors: David Kirk McAllister, Holladay, UT (US); Narayan Kulshrestha, Fremont, CA (US); Steven E. Molnar, Chapel Hill, CA (US)

(73) Assignee: Nvidia Corporation, Santa Clara, CA (US)

( * ) Notice: Subject to any disclaimer, the term of this patent is extended or adjusted under 35 U.S.C. 154(b) by 343 days.

(21) Appl. No.: 12/813,912

(22) Filed: Jun. 11, 2010

(51) Int. Cl.
*G06K 9/46* (2006.01)

(52) U.S. Cl.
USPC .......................................................... 382/232

(58) Field of Classification Search
None
See application file for complete search history.

(56) References Cited

U.S. PATENT DOCUMENTS

| | | | | |
|---|---|---|---|---|
| 4,947,447 A * | 8/1990 | Miyaoka et al. | ............... | 382/246 |
| 5,228,098 A * | 7/1993 | Crinon et al. | ................. | 382/240 |
| 5,446,806 A * | 8/1995 | Ran et al. | ....................... | 382/240 |
| 6,005,981 A * | 12/1999 | Ng et al. | ........................ | 382/240 |
| 6,084,908 A * | 7/2000 | Chiang et al. | ............ | 375/240.03 |
| 6,356,665 B1 * | 3/2002 | Lei et al. | ........................ | 382/240 |
| 6,600,836 B1 * | 7/2003 | Thyagarajan et al. | ........ | 382/239 |
| 6,967,663 B1 * | 11/2005 | Bastos et al. | .................. | 345/613 |
| 2004/0208392 A1 * | 10/2004 | Raveendran et al. | ......... | 382/268 |

* cited by examiner

*Primary Examiner* — Wenpeng Chen
*Assistant Examiner* — Feng Niu
(74) *Attorney, Agent, or Firm* — Patterson & Sheridan, L.L.P.

(57) ABSTRACT

One embodiment of the present invention sets forth a technique for compressing image data with high contrast between pixels within a tile and between samples within pixels without any data loss. Partial coverage layers are generated and written to a tile that includes multiple pixels without reading the existing image data that is stored for the tile. A partial coverage layer encodes image data, such as colors, and sub-pixel coverage information for each covered pixel in a tile. The use of partial coverage layers reduces the bandwidth used to store image data when a tile is not fully covered.

17 Claims, 13 Drawing Sheets

PARTIAL COVERAGE LAYERS FOR COLOR COMPRESSION

BACKGROUND OF THE INVENTION

1. Field of the Invention

The present invention generally relates to graphics processing and more specifically to compression of image data.

2. Description of the Related Art

Conventional graphics processors use compression to reduce the memory footprint of color data stored in the frame buffer and/or to reduce the bandwidth needed to access the color data stored in the frame buffer. Some forms of compression operate on tiles that include color data for several pixels. When the color data for multiple sub-pixel samples within a pixel or multiple pixels within a tile are compressed, high contrast silhouettes of graphics primitives within the tile are difficult to compress without a high rate of loss.

Accordingly, what is needed in the art is a system and method for compressing image data with high contrast between pixels within a tile and between samples within pixels.

SUMMARY OF THE INVENTION

A system and method for compressing image data with high contrast between pixels within a tile and between samples within pixels represents partial coverage layers without any data loss. The partial coverage layers are written to a tile that includes multiple pixels without reading the existing image data that is stored for the tile. A partial coverage layer encodes image data, such as colors, and sub-pixel coverage information for each covered pixel in a tile. The use of partial coverage layers beneficially reduces the bandwidth used to store image data when a tile is not fully covered.

Various embodiments of a method of the invention for generating partial coverage layers for image data include receiving the image data for a tile that includes multiple pixels and computing a layer count for the image data that indicates a number of partial coverage layers that are needed to encode the image data. When the layer count does not exceed a maximum allowed number of partial coverage layers a partial coverage layer is generated using at least a portion of the image data, the partial coverage layer covering only a portion of the multiple pixels included in the tile. The partial coverage layer is then written to the tile without reading existing image data that is stored for the tile.

Various embodiments of the invention include a system for generating partial coverage layers for image data. The system includes a processor that is configured to receive the image data for a tile that includes multiple pixels and compute a layer count for the image data that indicates a number of partial coverage layers that are needed to encode the image data. When the layer count does not exceed a maximum allowed number of partial coverage layers, the processor generates a partial coverage layer using at least a portion of the image data, where the partial coverage layer covers only a portion of the multiple pixels included in the tile. The partial coverage layer is then written to the tile without reading existing image data that is stored for the tile.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
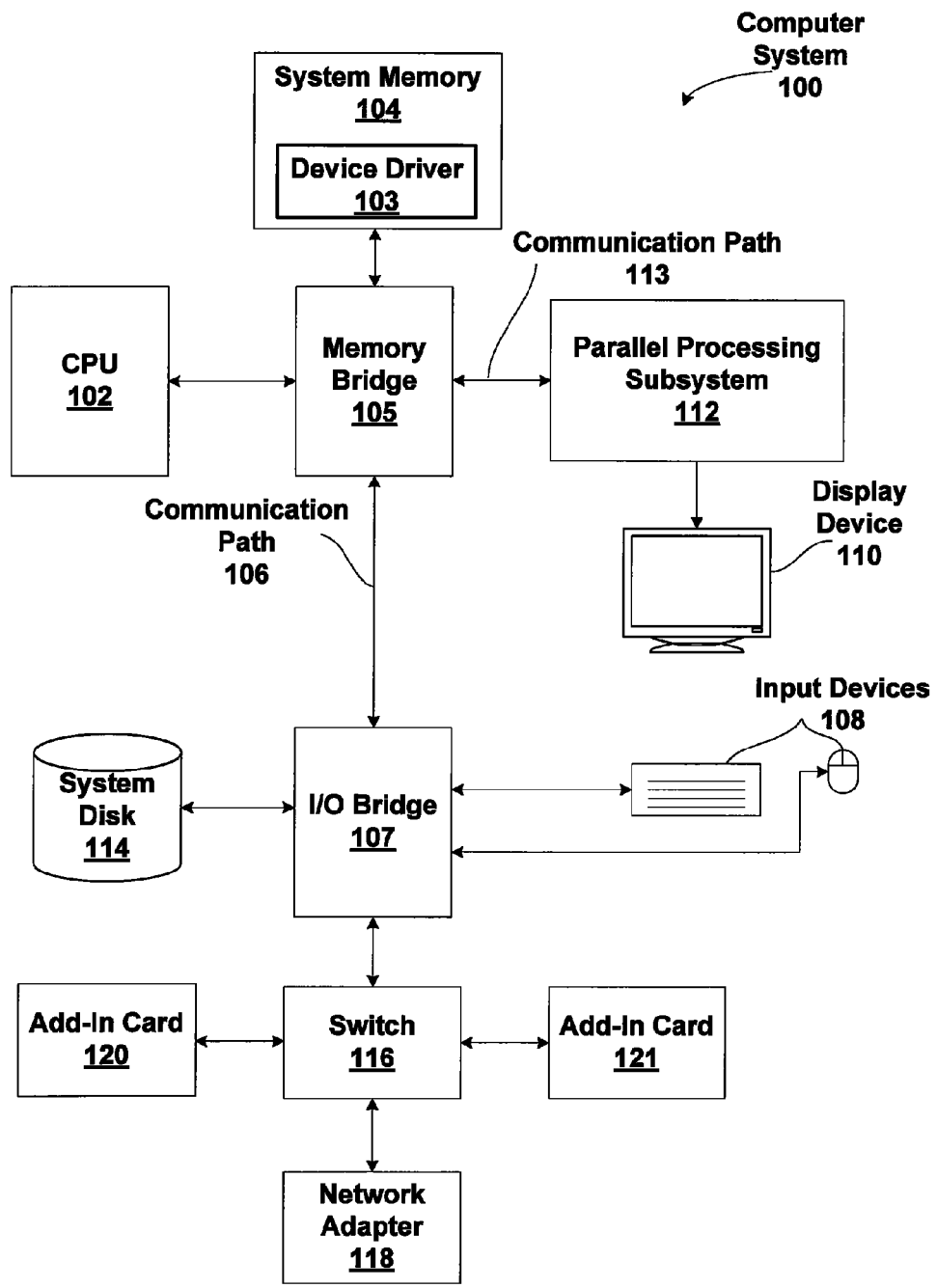
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
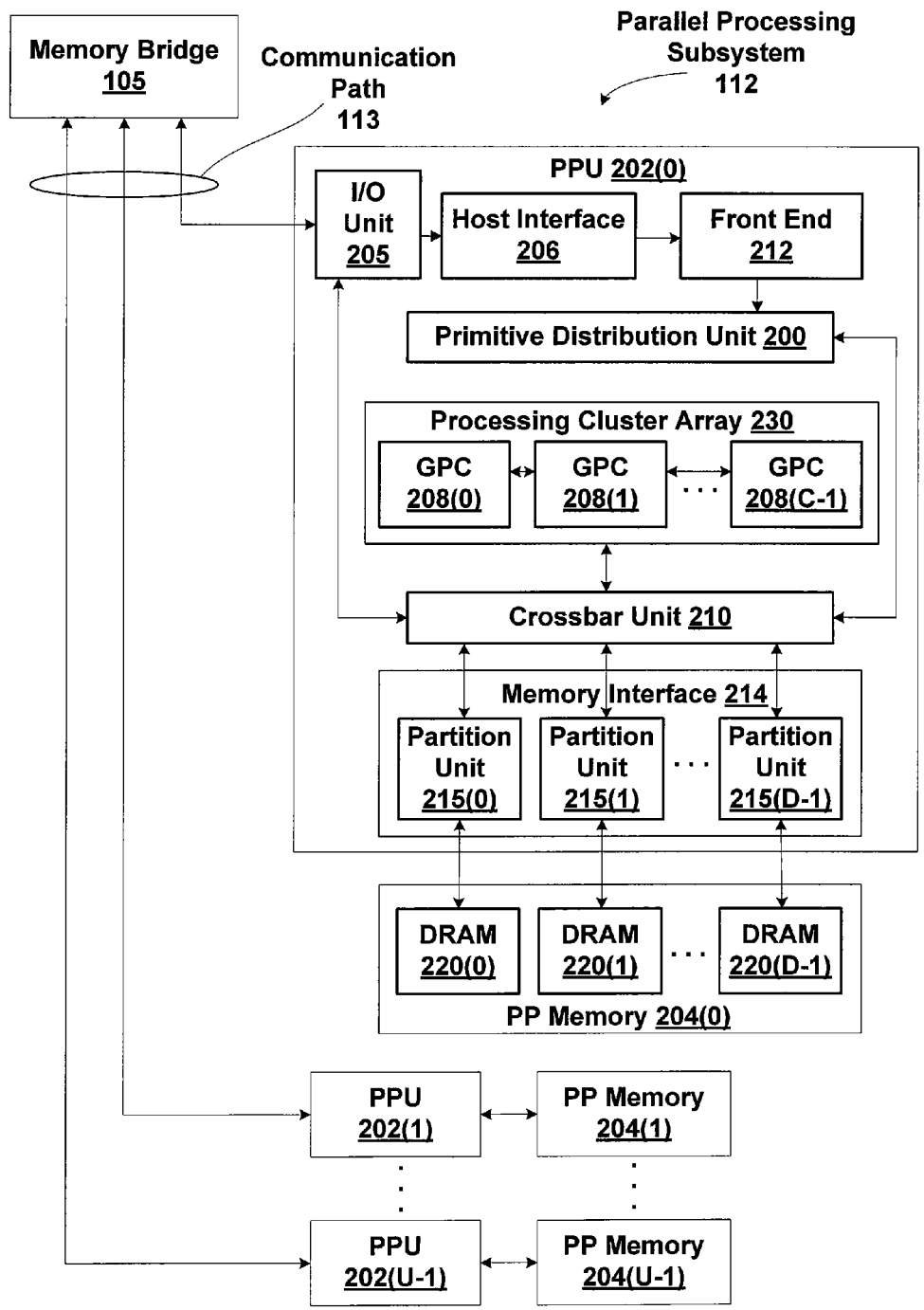
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1.

Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
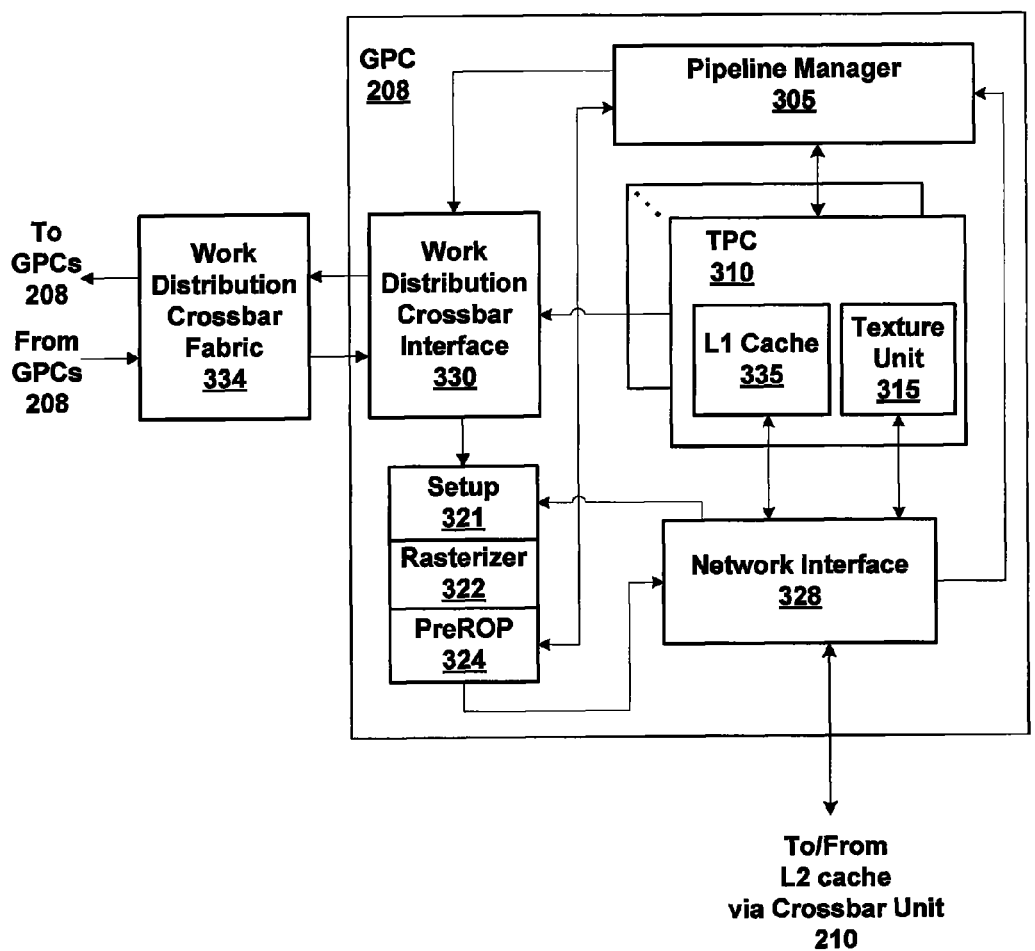
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≧1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute render target data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
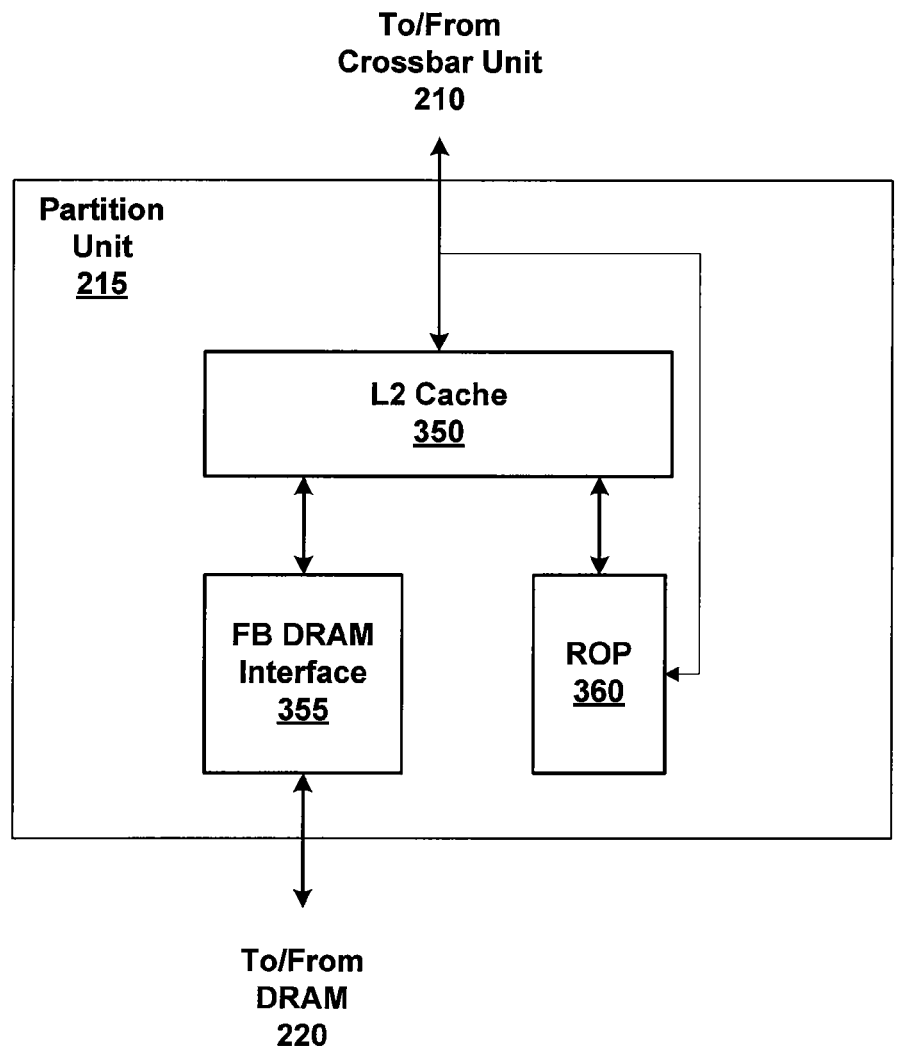
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. Each partition unit 215 includes a ROP 360 in order to distribute processing of the raster operations. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. ROP 360 receives color and z fragment data from the GPCs 208 and may be configured to compress z or color data that is written to memory and decompress z or color data that is read from memory. In some embodiments of the present invention, ROP 360 is included within each GPC 208 instead of partition unit 215, and pixel read and write requests are transmitted over crossbar unit 210 instead of pixel fragment data.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
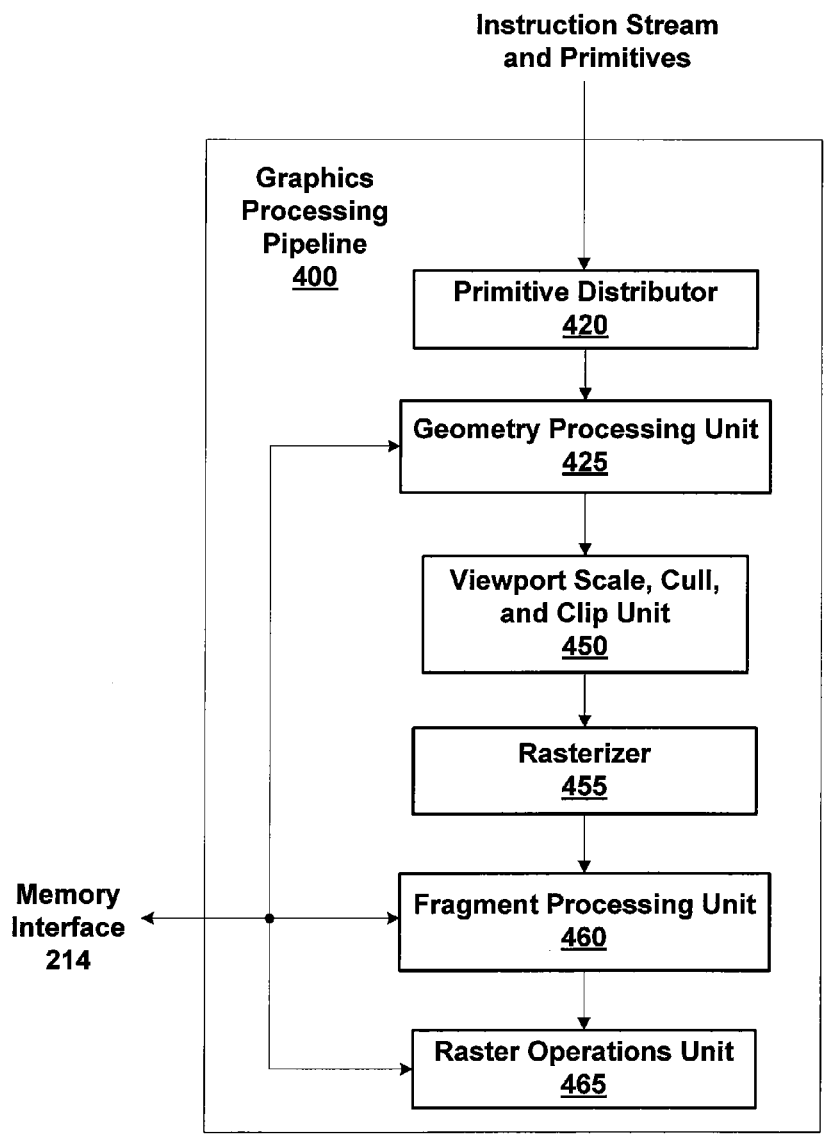
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32 B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Partial Coverage Layers

When the color data for multiple sub-pixel samples within a pixel or multiple pixels within a tile are compressed using partial coverage layers, high contrast silhouettes of graphics primitives within the tile may be encoded without losing any data. In conventional architectures, when image data for a tile does not fully cover the tile, the existing image data stored for the tile is read if the tile is represented in a compressed format. The image data is then merged with the existing image data, possibly compressed and then the merged image data is written back to the tile. In contrast, when partial coverage layers are generated that encode the image data, the partial coverage layers may be written to the tile without reading the existing image data from the tile. Consequently, using partial coverage layers to compress the image data reduces the amount of data written to the tile and does not require that the existing image data be read from the tile. Therefore, the tile memory footprint is reduced and the bandwidth needed to store the image data is reduced.

A partial coverage layer consists of coverage information indicating which samples are covered in the partial coverage layer and a set of image data, e.g., color values, alpha values, or the like, one value for each pixel that contains any covered samples. In one embodiment each partial coverage layer is encoded in one subpacket. When the image data cannot be represented in a single partial coverage layer, one or more additional partial coverage layers may be used to encode the image data. A full coverage layer may also be encoded for image data that completely covers a tile.

Figure 5A:
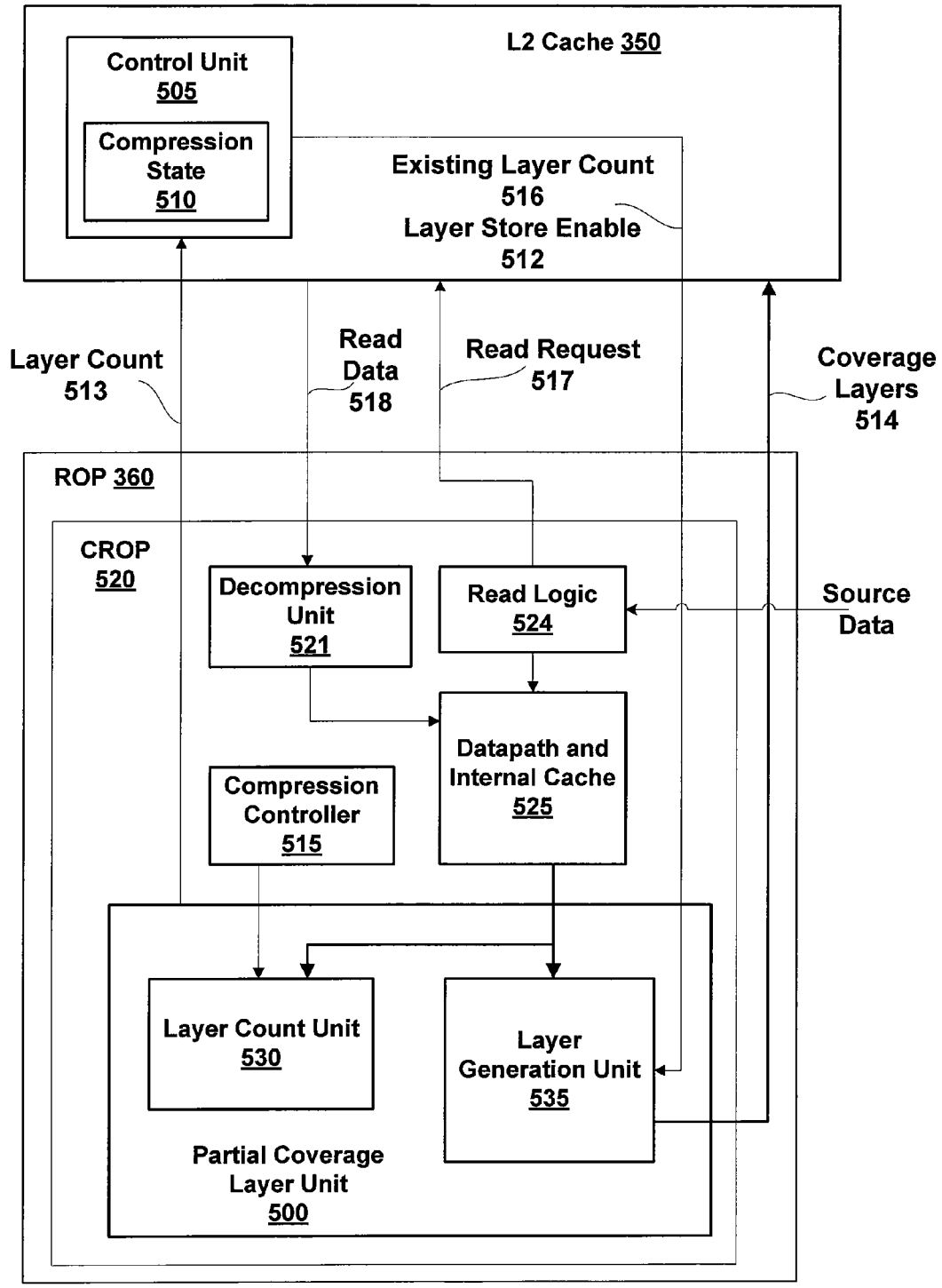
FIG. 5A is a block diagram of a portion of the raster operations unit and the L2 cache of FIG. 3B, according to one embodiment of the present invention.

FIG. 5A is a block diagram of a portion of the ROP 360 and the L2 cache 350 of FIG. 3B, according to one embodiment of the present invention. The ROP 360 includes a color raster operations unit (CROP) 520, and the CROP 520 includes a decompression unit 521, read logic 524, a compression controller 515, a datapath and internal cache 525, and a partial coverage layer unit 500. In operation, the CROP 520 performs color raster operations, including compression of color data written to and decompression of destination color data read from the L2 cache 350. The L2 cache 350 includes a control unit 505 that stores the compression status of one or more tiles in a compression state 510. The compression status may include a number of partial layers that are already stored for one or more tiles and the tile format (compressed or not).

When performing color raster operations, source and/or destination data for tiles is written to the CROP 520 and stored in the datapath and internal cache 525. The source data including sample color data and coverage information is received by read logic 524 and, if needed, read data 518 (destination data) is read from the L2 cache 350 according to a read request 517. The decompression unit 521 decompresses data when required. When blending, the datapath and internal cache 525 combines source and destination data and stores the results. When not blending, the datapath and internal cache 525 simply stores the source data. The combined source and destination data or source data is output by the datapath and internal cache 525 to the partial coverage layer unit 500 for lossless generation of one or more partial coverage layers that encode the color data in a compressed format. The color data is compressed by the partial coverage layer unit 500 based on the color data format and number of partial coverage layers that may be stored for the tile. The partial coverage layer unit 500 transmits the partial coverage layer(s) and/or a fully covered layer as write data 514 to the L2 cache unit 350 for storage. Write data 514 may include color data encoded in a compressed or uncompressed format.

The partial coverage layer unit 500 includes a layer count unit 530 and a layer generation unit 535. When instructed by the compression controller 515, the layer count unit 530 reads the image data from the datapath and internal cache 525 and a layer count 513 is computed by the layer count unit 530 and/or the layer generation unit 535 that indicates the number of partial coverage layers needed to encode the image data. In some embodiments, the layer count 513 is generated as source pixel data is written to the datapath and internal cache 525.

In those embodiments, a per-pixel count is maintained for each pixel in the tile stored in the datapath and internal cache 525 and the count is updated as each primitive that intersects the tile is written to the datapath and internal cache 525. Each per-pixel count is set to one for any pixels that are fully covered by a primitive and the per-pixel counts for pixels which are partially covered by the primitive are incremented. Thus, each per-pixel count indicates the non-overlapping primitive count for each pixel, i.e., the per-pixel partial layer count. In some cases, each primitive may not have a different color, so the per-pixel count may be higher than the number of different colors present in each pixel. The maximum of the per-pixel counts for the tile is used as the layer count 513, i.e., number of partial layers needed to encode the image data for the tile.

When the layer count 513 is greater than a maximum allowed number of partial layers and the new image data fully covers the tile, no partial coverage layers are generated, and the image data can be stored in an uncompressed format without reading existing data from the tile. When the layer count 513 is greater than a maximum allowed number of partial layers and the new image data does not fully cover the tile, no partial coverage layers are generated, and the image data is stored in an uncompressed format. When existing data is already stored for the tile, the new image data is merged with the existing data and the merged image data is stored in an uncompressed format. Existing data that is compressed is decompressed by the decompression unit 521 before being merged with the new image data. The decompression and merging operations may be performed by the CROP 520 when the existing data is read or in the L2 cache 350 when the L2 cache 350 receives the partial coverage layers from the CROP 520.

The maximum allowed number of partial layers may be programmed in some embodiments, and may vary depending on the sampling mode (number of samples per pixel). The value of the maximum allowed number of layers should ensure that the encoded partial coverage layers are stored in fewer bytes compared with the uncompressed image data for the tile. Also, a configurable maximum allowed number of partial layers is desirable to avoid multiple reads of existing tile image data when the tile is partially covered by several different primitives. When the layer count is not greater than the maximum allowed number of partial layers, the layer count 513 is output by the layer count unit 530 to the control unit 505 in the L2 cache 350. The control unit 505 determines if the number of partial coverage layers can be stored in the tile based on the compression status stored for the tile in compression state 510.

The compression state 510 includes information specifying the compression format of different render targets stored in graphics memory. The compression state 382 also stores information specifying the color depth, color format, and pixel sample mode for each render target. Examples of some possible color depth values include 8, 16, 24, 32, 64, 128 bits per channel for each sample of a pixel. The channels may represent red, green, blue, alpha, luminance, chrominance, saturation, and the like. The different channels may be represented in different formats, such as signed or unsigned integer or floating point values. Finally, different pixel sample modes specify one or more sub-pixel samples per pixel and positions of the sub-pixel samples within the pixel.

Several different conditions may influence whether or not the number of layers can be stored in the tile. For example, when one or more partial coverage layers are already stored for a tile, the sum of the existing partial coverage layers 516 and the layer count 513 may be greater than the maximum allowed number of layers. In other words, existing image data that is stored for the tile may occupy most of the storage space for the tile, leaving too little storage space for the number of partial coverage layers. The control unit 505 indicates to the layer generation unit 535 whether or not the number of layers can be stored in the tile by outputting a layer store enable 512 signal.

When the control unit 505 indicates that the number of layers (new and existing) can be stored in the tile, the layer generation unit 535 generates the partial coverage layers to encode the image data for the tile. When the tile is fully covered, the layer generation unit 535 generates a full coverage layer in addition to one or more partial coverage layers and outputs the full coverage layer and one or more partial coverage layers as write data 514. When the tile is not fully covered, the layer generation unit 535 generates one or more partial coverage layers that are output as write data 514. The write data 514 are output to the L2 cache 350 to be written to the tile. Importantly, the coverage layers are generated and written without reading any existing image data from the tile.

Figure 5B:
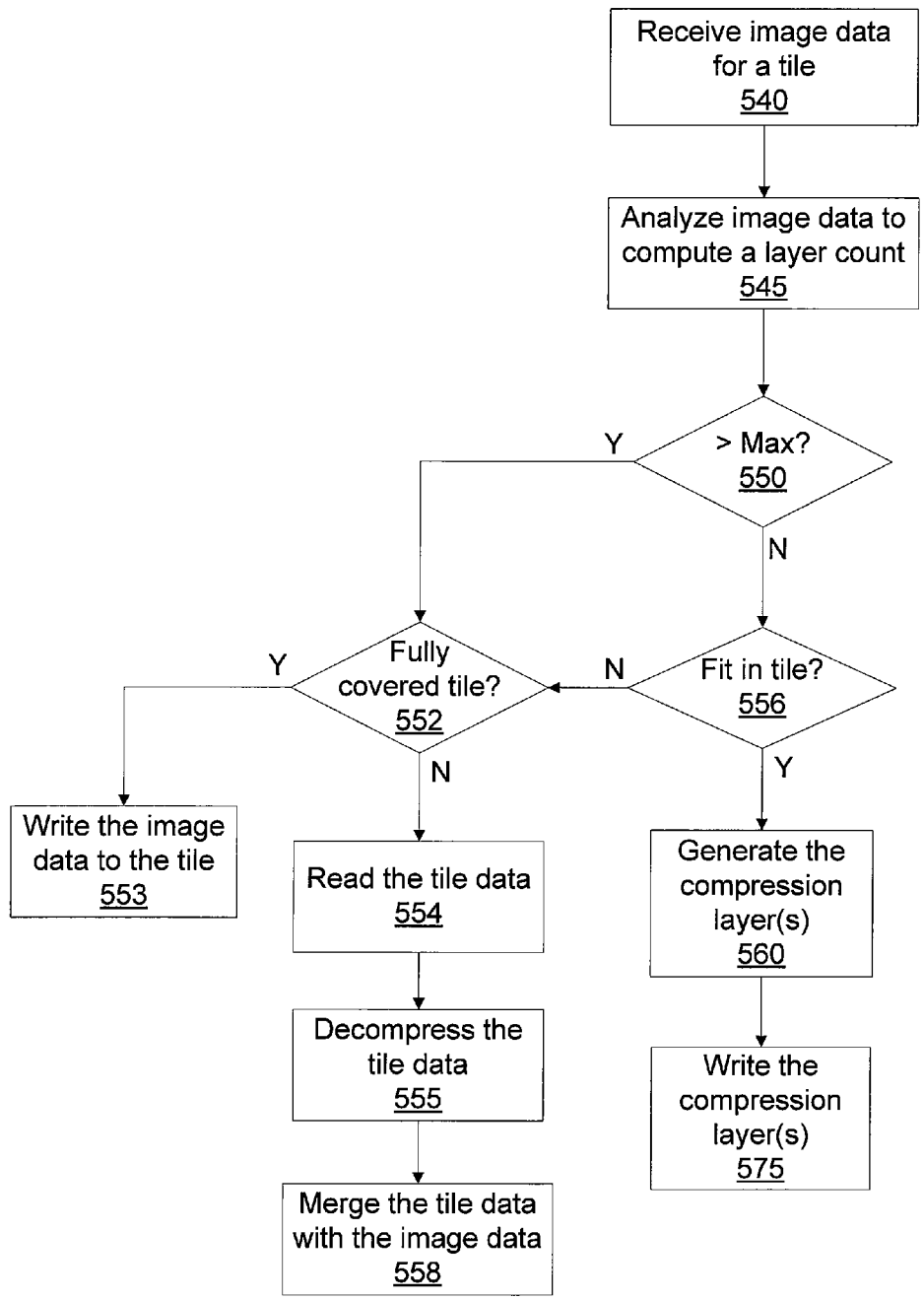
FIG. 5B is a flow diagram of method steps for processing image data to produce partial coverage layers, according to one embodiment of the present invention.

FIG. 5B is a flow diagram of method steps for processing image data for a tile to produce partial coverage layers, according to one embodiment of the present invention. At step 540 the image data for the tile is received. At step 545 the layer count unit 530 analyzes the image data for the tile to compute a layer count. At step 550, the layer count unit 530 determines if the layer count exceeds the maximum allowable layer count, and, if so, at step 552 the compression controller 515 determines if the tile is fully covered by the image data. If, at step 552 the tile is fully covered, then at step 553 the image data is written to the tile via L2 cache 350. If, at step 552 the tile is not fully covered, then at step 554 existing image data for the tile is read from the graphics memory (the existing tile data may be resident in L2 cache 350). If necessary, at step 555, the existing image data is decompressed. At step 558 the new image data is then merged with the existing tile data before being written to the tile.

If, at step 550, the layer count unit 530 determines that the layer count does not exceed the maximum allowable layer count, then at step 556 the control unit 505 determines if the number of partial coverage layers indicated by the layer count can be stored in the tile, i.e., fits in the tile. If, the number of partial coverage layers cannot fit in the tile, then at step 552 the compression controller 515 determines if the tile is fully covered by the image data and proceeds to either step 553 or 554.

If, at step 556 the control unit 505 determines that the number of partial coverage layers can fit in the tile, then at step 560 the layer generation unit 535 generates one or more partial coverage layers. Note, that in order to determine if the number of partial coverage layers can fit in the tile, the control unit 505 determines if the sum of the existing layer count 516 and the layer count 513 will fit in the tile. The layer generation unit 535 also generates a full coverage layer when the tile is fully covered by the image data. At step 575 the one or more partial coverage layers and any full coverage layer (compression layers) are output by the layer generation unit 535 as write data 514 to be written to the tile via the L2 cache 350. In one embodiment, when the surface kind enables zero-bandwidth clears, the L2 cache 350, based on the compression status will not write a full coverage layer into the tile and will write only the one or more partial coverage layers.

Figure 5C:
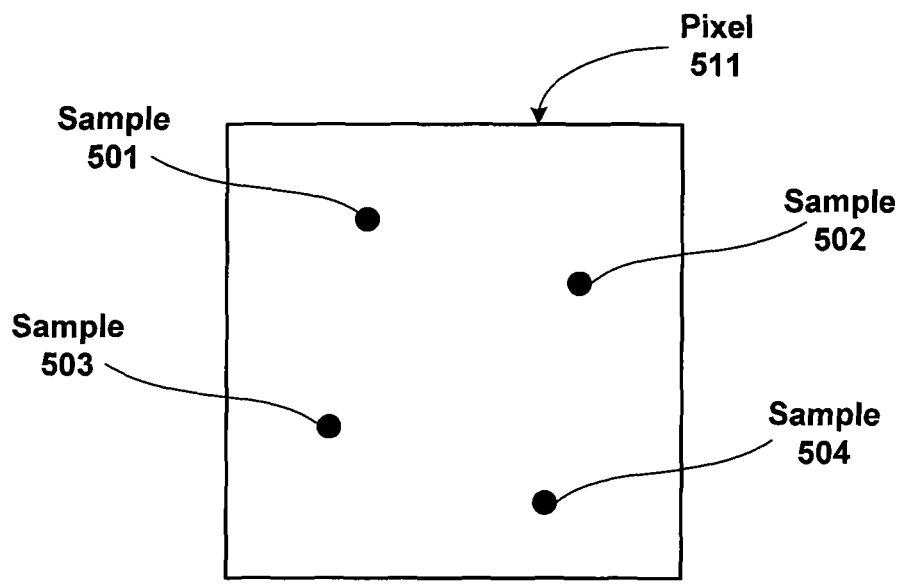
FIG. 5C is a diagram of sample locations within a pixel, according to one embodiment of the present invention.

FIG. 5C is a diagram of four sample locations within a pixel 511, according to one embodiment of the present invention. Other pixel sample modes may specify fewer or more sample positions within each pixel. The pixel 511 includes positions for samples 501, 502, 503, and 504. Layer count unit 530 is configured to analyze the image data to produce the layer count. The layer count may be determined by comparing the values for each covered sample within a pixel to compute the number of different per-sample values within each pixel. An equality test may be used for the comparisons. The value of sample 501 may be compared with the values of sample 502 and sample 503 and the value of sample 504 may be compared with the values of sample 502 and 503 to produce four bits of equality test results. The four bits may be used to compute the maximum number of unique values within a pixel of the tile as the layer count for the tile. A comparison between samples 501 and 504 and samples 502 and 503 may also be performed to detect whether those sample values match and produce a more accurate layer count. Note that the layer count cannot exceed the number of samples within a pixel of the tile. When the tile is fully covered, the layer count is reduced by one for the comparison to the maximum allowed number of partial coverage layers, since a full coverage layer is generated in addition to the one or more partial coverage layers. The full coverage layer is included when determining whether or not the partial coverage layers will fit in the tile.

Figure 5D:
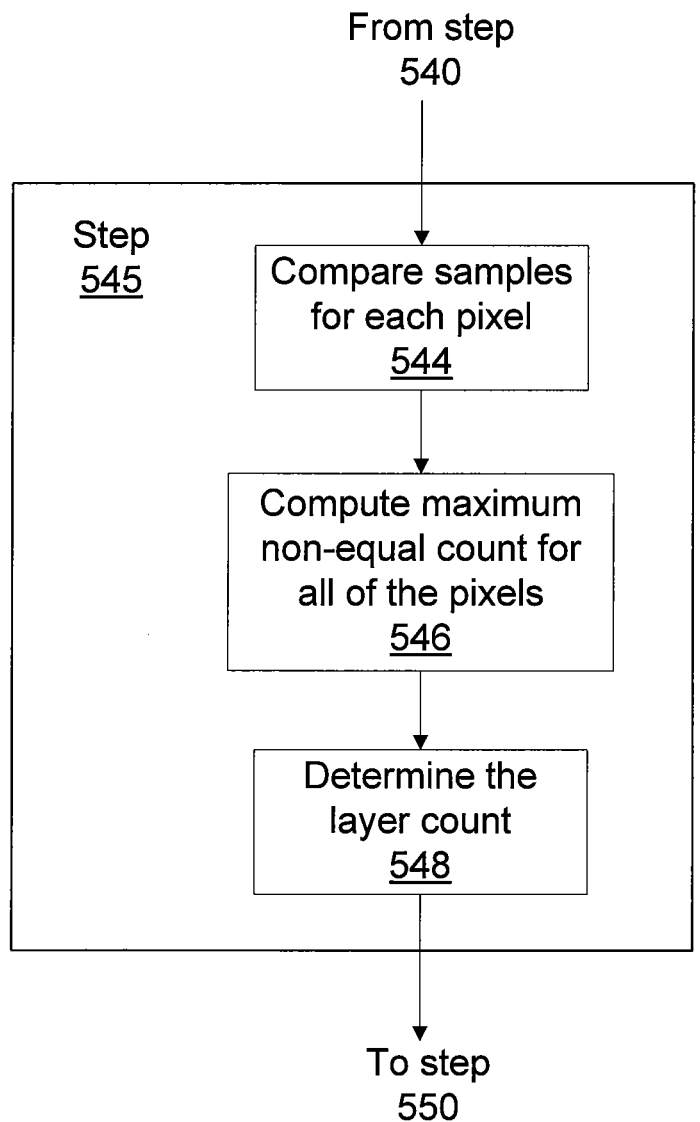
FIG. 5D is a flow diagram of a method step shown in FIG. 5B, according to one embodiment of the present invention.

FIG. 5D is a flow diagram of method step 545 shown in FIG. 5B, according to one embodiment of the present invention. At step 544 the layer count unit 530 compares the values of the covered samples within each pixel. At step 546 the layer count unit 530 computes the maximum number of different values for the covered samples of all of the pixels within the tile. At step 548 the layer count unit 530 sets the layer count to equal the maximum number of different values for the covered samples within a pixel of the tile as the layer count. The layer count is the number of partial coverage layers needed to encode the image data for the tile. The layer count includes the full coverage layer when the tile is fully covered by the image data.

Figure 5E:
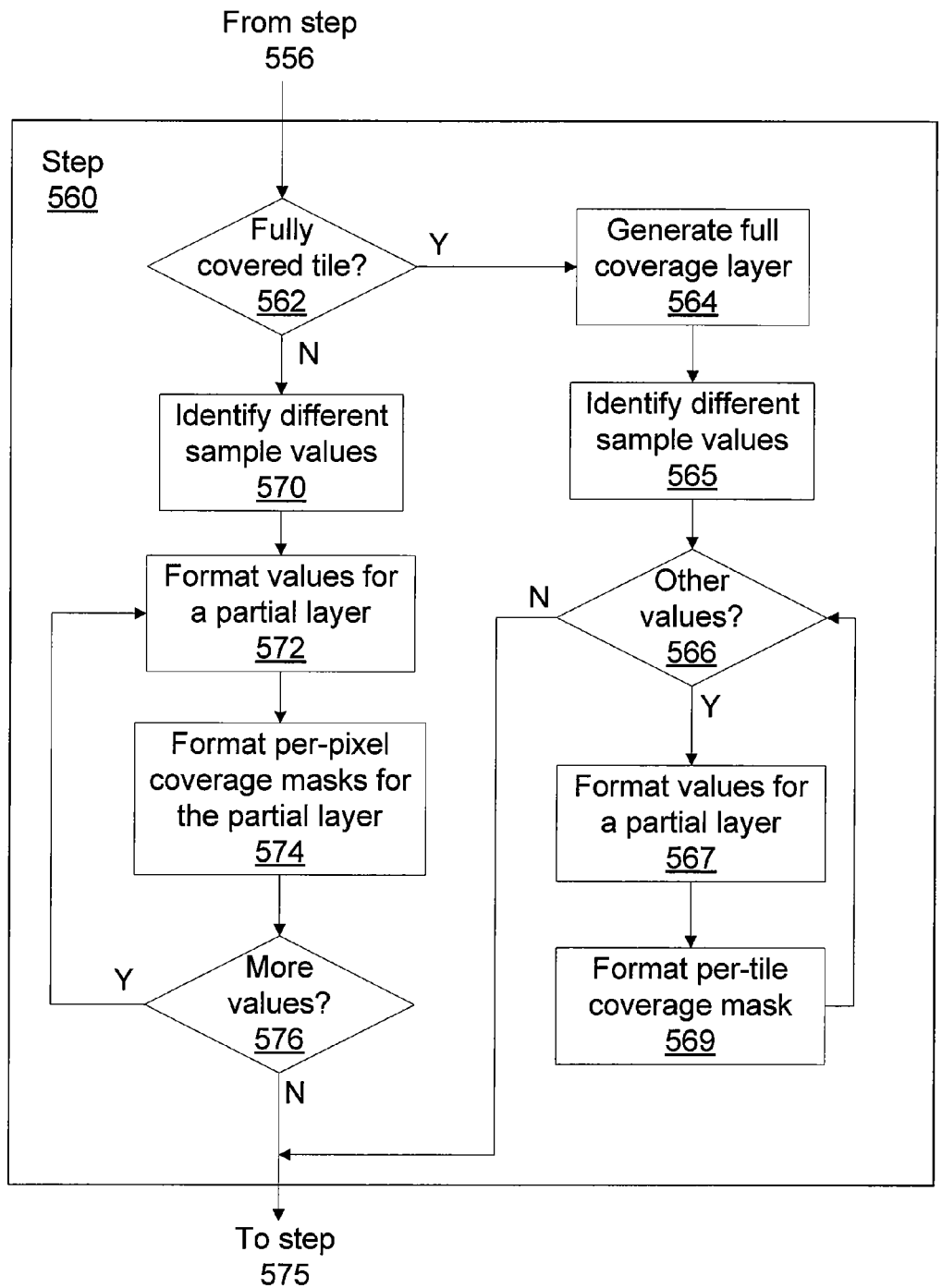
FIG. 5E is a flow diagram of another method step shown in FIG. 5B, according to one embodiment of the present invention.

FIG. 5E is a flow diagram of method step 560 shown in FIG. 5B, according to one embodiment of the present invention. At step 562 the layer generation unit 535 determines if the image data fully covers the tile, and, if so, at step 564 the layer generation unit 535 generates a full coverage layer. The full coverage layer includes the value of the same sample location within each one of the pixels. For example, the value of sample 501 (see FIG. 5C) within each pixel is included in the full coverage layer. At step 565 values of sibling samples (sibling samples are the other samples within a pixel) that differ from the value of the sample included in the full coverage layer are identified. When four samples are used within each pixel, up to three sibling samples may have different values than the sample included in the full coverage layer. The comparators used by the layer count unit 530 to compute the layer count may also be used to identify the samples with different sample values. The comparisons for all of the pixels may be performed in parallel to produce a result vector for each pixel.

At step 566 the layer generation unit 535 determines if any of the image data is not encoded in the compressed layer(s). In other words, the layer generation unit 535 determines if any of the pixels include a sample value that is different from the sample value in the full coverage layer and that is not included in any new partial coverage layer. When more sample values remain to be encoded, then the layer generation unit 535 proceeds to step 567 to produce a partial coverage layer. Otherwise, the layer generation unit 535 proceeds to step 575 and outputs the full coverage layer and any partial coverage layer(s).

At step 567 the different sample values are formatted to produce a partial layer. One sample value that differs from the sample value in the full coverage layer for each pixel may be included in the first partial coverage layer. Therefore, if a pixel includes three different sample values, a second partial coverage layer will be used to encode the third different sample value. The same sample position is not necessarily used for each pixel to produce each partial coverage layer. At step 569 the layer generation unit 535 formats the per-tile coverage mask for the partial coverage layer and returns to step 566. The per-tile coverage mask indicates which samples within each pixel are associated with the sample value in the partial coverage layer.

Returning to step 562, when the layer generation unit 535 determines that the image data does not fully cover the tile, then at step 570 the layer generation unit 535 identifies the different values of the covered samples within each pixel. Since some of the pixels in the tile may be fully covered, up to four samples may have different values when four samples are used for each pixel. The comparators used by the layer count unit 530 to compute the layer count may also be used to identify the different sample values for each pixel. The comparisons for all of the pixels may be performed in parallel to produce a result vector for each pixel.

At step 572 the different sample values are formatted to produce a partial layer. The number of different sample values that can be stored in a partial coverage layer depends on the number of bits each sample value requires when the size of each partial coverage layer is fixed. Only a single one of the different sample values for a pixel may be included in the first partial coverage layer. Therefore, if a pixel includes two different sample values, a second partial coverage layer will be used to encode the second different sample value. The same sample position is not necessarily used for each pixel to produce each partial coverage layer. Since all of the pixels may not be covered by the image data, an identifier (index) for each pixel associated with one of the different sample values in the partial coverage layer is also included in the partial coverage layer.

At step 574 the layer generation unit 535 formats the per-pixel sample coverage mask corresponding to each pixel with one or more samples encoded in the partial coverage layer. The per-pixel coverage mask indicates which samples within each pixel are associated one of the sample values in the partial coverage layer.

At step 576 the layer generation unit 535 determines if any of the image data is not encoded in the partial coverage layer. In other words, the layer generation unit 535 determines if any of the pixels include a sample value that is not included in the partial coverage layer. When more sample values remain to be encoded, then the layer generation unit 535 returns to step 572 to produce another partial coverage layer. Otherwise, the layer generation unit 535 proceeds to step 575 and outputs the partial coverage layer(s).

Figure 6A:
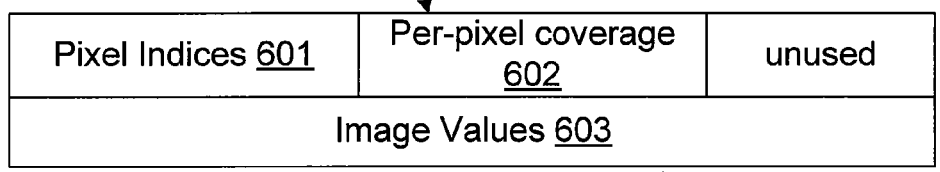
FIG. 6A is a diagram of a partially covered layer format that is used to encode a partially covered pixel tile, according to one embodiment of the present invention.

FIG. 6A is a diagram of a partially covered format 600 that is used to encode a partial coverage layer for a partially covered pixel tile, according to one embodiment of the present invention. The partially covered format 600 includes a pixel indices 601 field, a per-pixel coverage 602 field, and an image values 603 field. The partial coverage layer format may also include an unused field. One or more pixel identifiers are encoded in the pixel indices 601. For each one of the pixel identifiers, a sample coverage mask is encoded in per-pixel coverage 602 and a sample value is encoded in image values 603. The field width of the pixel indices 601 depends on the number of pixels in the tile. The field width of the per-pixel coverage 602 depends on the pixel sample format, i.e., number of samples per pixel.

In some embodiments, each partial coverage layer encoded using partially covered format 600 includes no more than six pixel identifiers (in pixel indices 601), six per-pixel sample coverage masks (in per-pixel coverage 602), and six sample values (in image values 603). This new encoding that represents a partial coverage layer can use simpler decompression hardware compared with a conventional encoding using a per-tile mask since it is necessary to determine which samples within each pixel are covered by the image data and the covered pixel samples are hard to derive from a per-tile coverage mask. TABLE 1 illustrates examples of different field widths needed to encode different image data formats.

TABLE 1

| Bits per sample | Samples per pixel | Samples per tile | Pixels per tile | Bits per index | Bits per sample mask | Pixels per layer | Total index bits | Total sample mask bits | Total coverage bits |
| --- | --- | --- | --- | --- | --- | --- | --- | --- | --- |
| 32  | 1 | 64 | 64 | 6 | 1 | 6 | 36 | 6  | 42 |
| 32  | 4 | 64 | 16 | 4 | 4 | 6 | 24 | 24 | 48 |
| 32  | 8 | 64 | 8  | 3 | 8 | 6 | 18 | 48 | 66 |
| 64  | 1 | 32 | 32 | 5 | 1 | 3 | 15 | 3  | 18 |
| 64  | 4 | 32 | 8  | 3 | 4 | 3 | 9  | 12 | 21 |
| 64  | 8 | 32 | 4  | 2 | 8 | 3 | 6  | 24 | 30 |
| 128 | 1 | 16 | 16 | 4 | 1 | 1 | 4  | 1  | 5  |
| 128 | 4 | 16 | 4  | 2 | 4 | 1 | 2  | 4  | 6  |
| 128 | 8 | 16 | 2  | 1 | 8 | 1 | 1  | 8  | 9  |

As shown in TABLE 1, when 32 bits are used per sample with 4 samples per pixel (the second row), 48 bits are needed to store all of the sample coverage mask bits. In some embodiments, the per-pixel coverage 602 field is only 64 bits wide. Therefore, a variation of the encoding may be used. One option for storing the $65^{th}$ and $66^{th}$ bits of the sample coverage masks is to include the indices of pixels that are not covered by the image data, rather than including indices of pixels that are covered by the image data. Another option is to include some of the pixel indices as two-bit increments relative to the other indices. Yet another option is to include only the two least significant bits of the last two pixel indices since the last two pixel indices always have most significant bits of one (assuming the indices are ordered in the pixel indices 601).

Figure 6B:
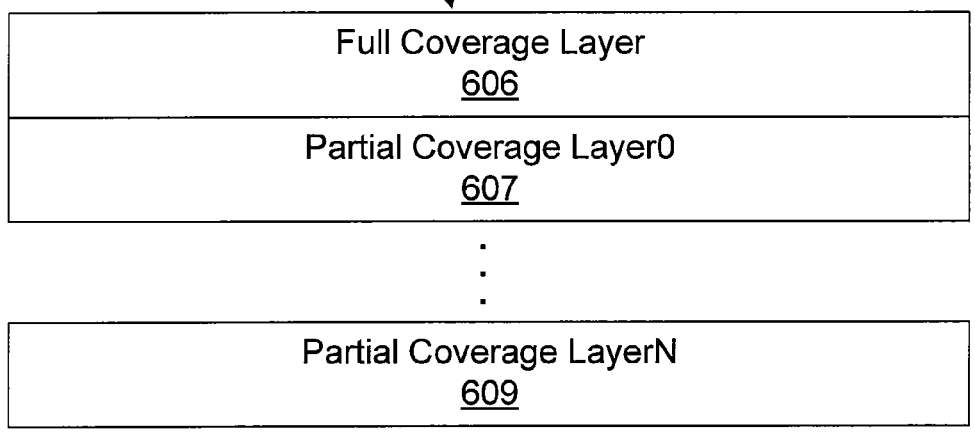
FIG. 6B is a diagram of a fully covered format that is used to encode a fully covered pixel tile, according to one embodiment of the present invention.

FIG. 6B is a diagram of a transaction representing a fully covered compression format 605 that is used to encode a full coverage layer 606 and one or more partial coverage layers for a fully covered pixel tile, according to one embodiment of the present invention. The full coverage layer 606 encodes a first image value for each pixel in the tile. The format of the full coverage layer 606 may be simply the set of these image values, or an encoding of these image values, such as to further compress them. Samples in the pixels of the tile that differ in value from the image value stored for the corresponding pixel in the full coverage layer 606 are stored in the partial coverage layers 0 through N. These image values are assigned to locations in the partial coverage layers 607 and 609. When a partial coverage layer 607 is full or when an additional distinct sample image value for a given pixel is encountered the distinct sample image value is assigned to an additional partial coverage layer. The format of the partial coverage layers 607 through 609 when output together with the full coverage layer 606 is the same as when the partial coverage layers 607 through 609 are output without a full coverage layer, and is described in FIG. 6A.

As previously described in conjunction with FIG. 5C and step 565 of FIG. 5E, a result vector indicating differing sample values may be generated for each pixel that is used to encode the pixel data for a fully covered tile. TABLE 2 illustrates the relationship between the result vector and the partial coverage layers, where e01, e23, e02, and e13 are the equality comparisons between samples 501 and 502 (of FIG. 5C), samples 503 and 504, samples 501 and 503, and samples 502 and 504, respectively. NumValues is the number of different sample values that are in the pixel. P1, P2, and P3 indicate which sample is included in the first, second, and third partial coverage layer, respectively. C1, C2, and C3 indicate the pixel coverage mask (with a 0 appended for the sample in the full coverage layer) that is included in the first, second, and third partial coverage layer, respectively.

TABLE 2

| E01 | E23 | E02 | E13 | NumValues | P1 | P2 | P3 | C1 | C2 | C3 |
|---|---|---|---|---|---|---|---|---|---|---|
| 0 | 0 | 0 | 0 | 4 | 1 | 2 | 3 | 001 | 010 | 100 |
| 0 | 0 | 0 | 1 | 3 | 1 | 2 |   | 101 | 010 |   |
| 0 | 0 | 1 | 0 | 3 | 1 | 3 |   | 001 | 100 |   |
| 0 | 0 | 1 | 1 | 2 | 1 |   |   | 101 |   |   |
| 0 | 1 | 0 | 0 | 3 | 1 | 2 |   | 001 | 110 |   |
| 0 | 1 | 0 | 1 | 2 | 1 |   |   | 111 |   |   |
| 0 | 1 | 1 | 0 | 2 | 1 |   |   | 001 |   |   |
| 0 | 1 | 1 | 1 | Impossible |   |   |   |   |   |   |
| 1 | 0 | 0 | 0 | 3 | 2 | 3 |   | 010 | 100 |   |
| 1 | 0 | 0 | 1 | 2 | 2 |   |   | 010 |   |   |
| 1 | 0 | 1 | 0 | 2 | 3 |   |   | 100 |   |   |
| 1 | 0 | 1 | 1 | Impossible |   |   |   |   |   |   |
| 1 | 1 | 0 | 0 | 2 | 2 |   |   | 110 |   |   |
| 1 | 1 | 0 | 1 | Impossible |   |   |   |   |   |   |
| 1 | 1 | 1 | 0 | Impossible |   |   |   |   |   |   |
| 1 | 1 | 1 | 1 | 1 |   |   |   |   |   |   |

Figure 6C:
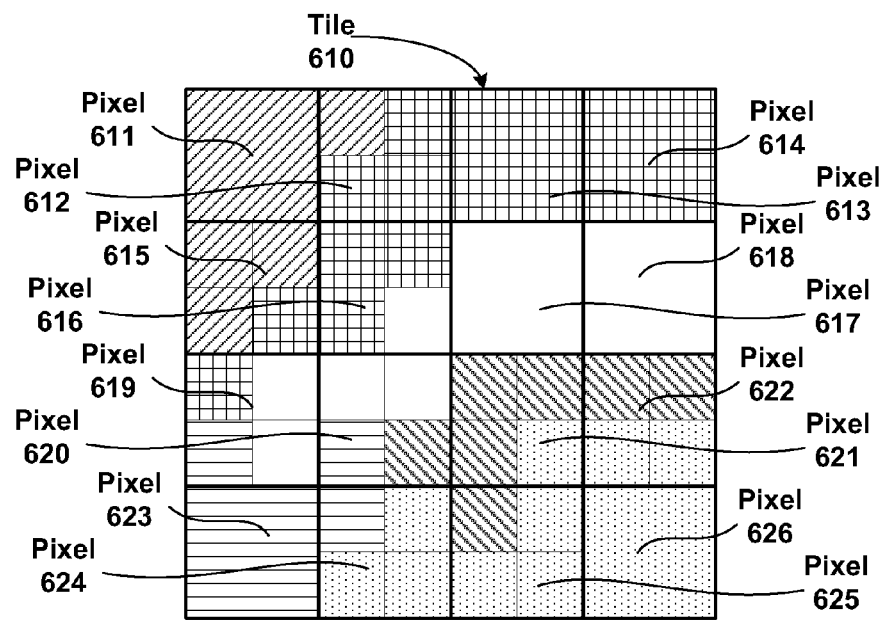
FIG. 6C is a conceptual diagram of image data for a fully covered pixel tile, according to one embodiment of the present invention.

FIG. 6C is a conceptual diagram of image data for a fully covered pixel tile 610, according to one embodiment of the present invention. Four samples are included in each pixel and the tile is 4×4 pixels. The tile 610 is fully covered by six primitives that are shown in six different patterns. All sibling samples covered by the same primitive have matching sample values. However, within some of the pixels the sibling samples differ in value. Therefore, the image data cannot be reduced so that a single sample value represents each pixel, and a partial coverage layer is needed to encode the image data in a compressed format.

As shown in FIG. 6C, a first primitive covers at least one sample of pixels 611, 612, and 615. A second primitive covers at least one sample of pixels 612, 613, 614, 615, 616, and 619. A third primitive covers at least one sample of pixels 616, 617, 618, 619, and 620. A fourth primitive covers at least one sample of pixels 620, 621, 622, and 625. A fifth primitive covers at least one sample of pixels 619, 620, 623 and 624. A sixth primitive covers at least one sample of pixels 621, 622, 624, 625, and 626.

Figure 6D:
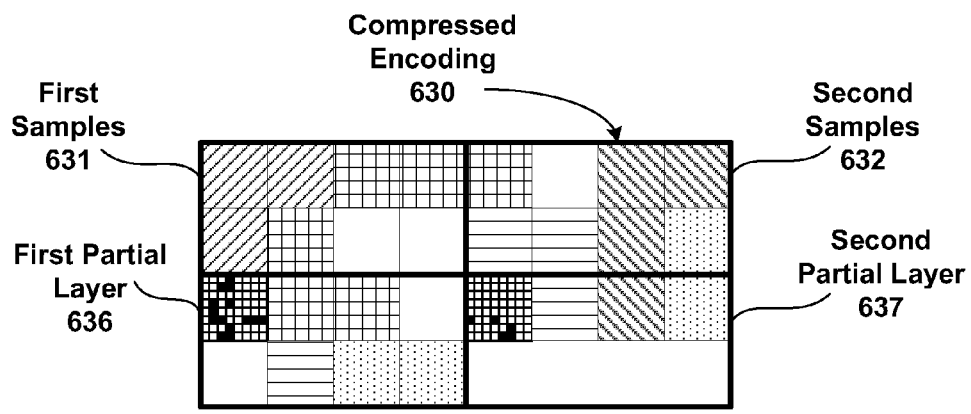
FIG. 6D is a conceptual diagram of the fully covered layer format encoding the image data shown in FIG. 6C, according to one embodiment of the present invention.

FIG. 6D is a conceptual diagram of the fully covered format encoding of the image data shown in FIG. 6C, according to one embodiment of the present invention. One sample from each pixel is stored in the full coverage layer, e.g., first samples 631 and first samples 632. As shown in FIG. 6D the first samples 631 includes the upper left sample from each of pixels 611, 612, 613, 614, 615, 616, 617, and 618. The second samples 632 includes the upper left sample from each of pixels 619, 620, 621, 622, 623, 624, 625, and 626.

The first partial layer 636 includes a per-tile coverage mask indicating which samples are covered by each of the seven sample values that are also included in the first partial layer 636. The first partial layer is configured to store only seven sample values for the data format used to represent the pixel data. Therefore, a second partial layer 637 is used to encode the remaining samples of pixel 625 and the third different sample from each of pixels 619 and 620. The second partial layer 637 includes a per-tile coverage mask indicating which samples are covered by each of the three sample values that are also included in the second partial layer 637. Note that samples of pixels that are fully covered by a single primitive are not included in the first partial layer or the second partial layer, e.g., samples within pixels 611, 613, 614, 617, 618, 623, and 626. The compression ratio of the image data for tile 610 compared with the compressed encoding 630 is greater than two to one.

Figure 6E:
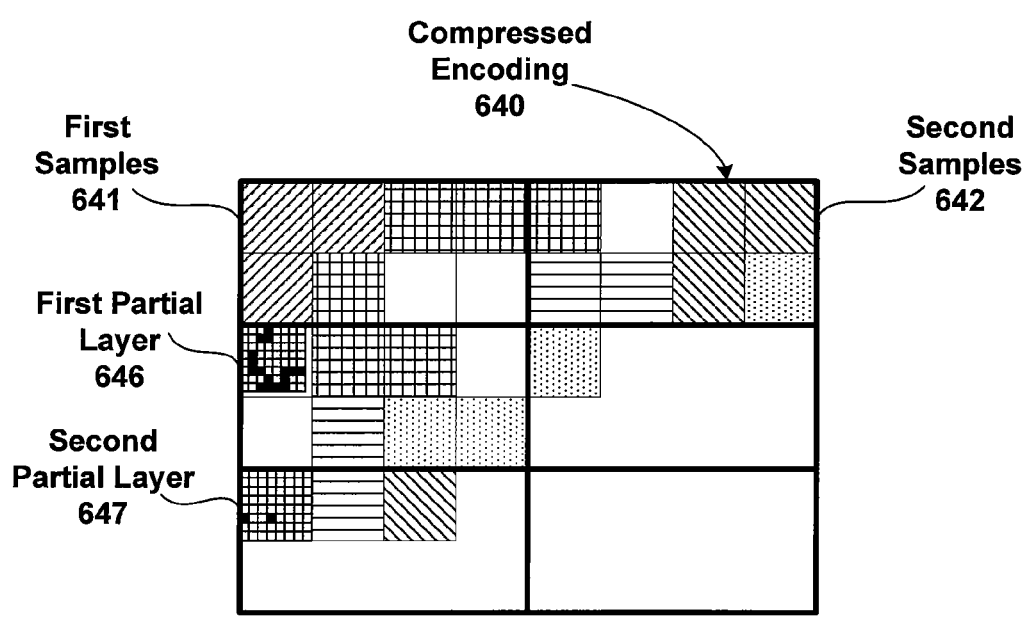
FIG. 6E is a conceptual diagram of another fully covered layer format encoding the image data shown in FIG. 6C, according to one embodiment of the present invention.

FIG. 6E is a conceptual diagram of another fully covered format encoding of the image data shown in FIG. 6C, according to one embodiment of the present invention. The format shown in FIG. 6E includes a larger image values 603 field. Note that the size of first partial layer 646 is twice that of first partial layer 636 in FIG. 6D. The values in the full coverage layer are encoded as first samples 641 and second samples 642.

The first partial layer 646 includes a per-tile coverage mask indicating which samples are covered by each of the eight sample values that are also included in the first partial layer 646. The second partial layer 647 includes a per-tile coverage mask indicating which samples are covered by each of the two sample values that are also included in the second partial layer 647. The compression ratio of the image data for tile 610 compared with the compressed encoding 640 is greater than two to one.

The technique of encoding image data into one or more partial coverage layers compresses the image data and reduces reads of the existing image data stored for the tile. The partial coverage layers are particularly well-suited to encode image data with high contrast between pixels within a tile and between samples within pixels without any data loss. Partial coverage layers are generated and written to a tile that includes multiple pixels without reading the existing image data that is stored for the tile. The use of partial coverage layers beneficially reduces the bandwidth used to store image data when a tile is not fully covered.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for generating partial coverage layers for image data, the method comprising:
   receiving the image data for a tile that includes multiple samples;
   computing a layer count for the image data that indicates a number of partial coverage layers that are needed to encode the image data;
   determining that the layer count does not exceed a maximum allowed number of partial coverage layers;
   generating a full coverage layer including one sample from each pixel in the tile when the image data fully covers the tile;
   generating a partial coverage layer using at least a portion of the image data, the partial coverage layer covering only a portion of the multiple pixels included in the tile; and
   writing the partial coverage layer to the tile without reading existing image data that is stored for the tile.

2. The method of claim 1, wherein the step of generating the partial coverage layer comprises:
   identifying any per-sample pixel values of each pixel that differ from the one sample of the pixel that is included in the full coverage layer; and
   encoding the differing per-sample pixel values and a sample coverage mask for the tile to produce the partial coverage layer.

3. The method of claim 1, further comprising the step of generating a full coverage layer that is represented in a compressed format when the image data fully covers the tile.

4. The method of claim 1, further comprising the step of determining that the number of partial coverage layers indicated by the layer count can be stored in the tile based on a compression status of the tile.

5. The method of claim 1, further comprising the steps of:
   receiving second image data for the tile;
   computing a second layer count for the second image data that indicates a number of partial coverage layers that are needed to encode the second image data;
   determining that the second layer count does exceed the maximum allowed number of partial coverage layers; and
   writing the second image data to the tile when the second image data fully covers the tile.

6. The method of claim 1, further comprising the steps of:
   receiving second image data for the tile;
   computing a second layer count for the second image data that indicates a number of partial coverage layers that are needed to encode the second image data;
   determining that the second layer count does exceed the maximum allowed number of partial coverage layers;
   reading the existing image data that is stored for the tile when the second image data does not fully cover the tile;
   merging the second image data for the tile with the existing image data to produce merged image data; and
   writing the merged image data to the tile.

7. The method of claim 1, wherein the step of generating the partial coverage layer comprises:
   identifying different per-sample pixel values for each covered sample of the multiple pixels in the tile; and
   encoding the different per-sample pixel values, per-pixel sample coverage masks for each covered pixel in the tile, and a pixel identifier for each covered pixel in the tile to produce the partial coverage layer.

8. A non-transitory computer-readable storage medium storing instructions that, when executed by a processor, cause the processor to generate partial coverage layers for image data, by performing the steps of:
   receiving the image data for a tile that includes multiple pixels;
   computing a layer count for the image data that indicates a number of partial coverage layers that are needed to encode the image data;
   determining that the layer count does not exceed a maximum allowed number of partial coverage layers;
   generating a full coverage layer including one sample from each pixel in the tile when the image data fully covers the tile;
   generating a partial coverage layer using at least a portion of the image data, the partial coverage layer covering only a portion of the multiple pixels included in the tile; and
   writing the partial coverage layer to the tile without reading existing image data that is stored for the tile.

9. The computer-readable storage medium of claim 8, further comprising the step of determining that the number of partial coverage layers indicated by the layer count can be stored in the tile based on a compression status of the tile.

10. The computer-readable storage medium of claim 8, further comprising the steps of:
    receiving second image data for the tile;
    computing a second layer count for the second image data that indicates a number of partial coverage layers that are needed to encode the second image data;
    determining that the second layer count does exceed the maximum allowed number of partial coverage layers; and
    writing the second image data to the tile when the second image data fully covers the tile.

11. A system for generating partial coverage layers for image data, the system comprising:
    a processor configured to:
      receive the image data for a tile that includes multiple pixels;
      compute a layer count for the image data that indicates a number of partial coverage layers that are needed to encode the image data;
      determine when the layer count does not exceed a maximum allowed number of partial coverage layers;
      generate a full coverage layer including one sample from each pixel in the tile when the image data fully covers the tile;
      generate a partial coverage layer using at least a portion of the image data when the layer count does not exceed the maximum allowed number of partial coverage layers, the partial coverage layer covering only a portion of the multiple pixels included in the tile; and
      write the partial coverage layer to the tile without reading existing image data that is stored for the tile.

12. The system of claim 11, further comprising a memory storing instructions that, when executed by the processor, configures the processor to:
    receive the image data for the tile;
    compare the layer count for the image data;
    determine when the layer count does not exceed a maximum allowed number of partial coverage layers;
    generate a partial coverage layer; and
    write the partial coverage layer to the tile.

13. The system of claim 11, wherein the generation of the partial coverage layer comprises:
  identifying any per-sample pixel values of each pixel that differ from the one sample of the pixel that is included in the full coverage layer; and
  encoding the differing per-sample pixel values and a sample coverage mask for the tile to produce the partial coverage layer.

14. The system of claim 11, wherein the processor is further configured to determine that the number of partial coverage layers indicated by the layer count can be stored in the tile in the tile based on a compression status of the tile.

15. The system of claim 11, wherein the processor is further configured to:
  receive second image data for the tile;
  compute a second layer count for the second image data that indicates a number of partial coverage layers that are needed to encode the second image data;
  determine when the second layer count does exceed the maximum allowed number of partial coverage layers; and
  write the second image data to the tile when the second image data fully covers the tile and when the second layer count does exceed the maximum allowed number of partial coverage layers.

16. The system of claim 11, wherein the processor is further configured to:
  receive second image data for the tile;
  compute a second layer count for the second image data that indicates a number of partial coverage layers that are needed to encode the second image data;
  determine when the second layer count does exceed the maximum allowed number of partial coverage layers;
  read the existing image data that is stored for the tile when the second image data does not fully cover the tile and when the second layer count does exceed the maximum allowed number of partial coverage layers;
  merge the second image data for the tile with the existing image data to produce merged image data; and
  write the merged image data to the tile.

17. The system of claim 11, wherein the generation of the partial coverage layer comprises:
  identifying different per-sample pixel values for each covered sample of the multiple pixels in the tile; and
  encoding the different per-sample pixel values, per-pixel sample coverage masks for each covered pixel in the tile, and a pixel identifier for each covered pixel in the tile to produce the partial coverage layer.

\* \* \* \* \*

UNITED STATES PATENT AND TRADEMARK OFFICE
CERTIFICATE OF CORRECTION

PATENT NO.         : 8,488,890 B1
APPLICATION NO.    : 12/813912
DATED              : July 16, 2013
INVENTOR(S)        : David Kirk McAllister et al.

It is certified that error appears in the above-identified patent and that said Letters Patent is hereby corrected as shown below:

Title Page, Inventors item (75):

Delete "Chapel Hill, CA" and insert --Chapel Hill, NC-- therefor.

Signed and Sealed this
First Day of October, 2013

Teresa Stanek Rea
*Deputy Director of the United States Patent and Trademark Office*